(12) United States Patent
Bao

(10) Patent No.: US 12,546,112 B2
(45) Date of Patent: Feb. 10, 2026

(54) HEAT INSULATION COMPOSITE BOARD AND MANUFACTURING METHOD THEREOF

(71) Applicant: CHENGJI PASSIVE HOUSE (HANGZHOU) CO. LTD., Zhejiang (CN)

(72) Inventor: Chengji Bao, Zhejiang (CN)

(73) Assignee: Chengji Bao, Zhejiang (CN)

( * ) Notice: Subject to any disclaimer, the term of this patent is extended or adjusted under 35 U.S.C. 154(b) by 0 days.

(21) Appl. No.: 17/633,549

(22) PCT Filed: Dec. 23, 2021

(86) PCT No.: PCT/CN2021/140939
§ 371 (c)(1),
(2) Date: Feb. 7, 2022

(87) PCT Pub. No.: WO2022/122046
PCT Pub. Date: Jun. 16, 2022

(65) Prior Publication Data
US 2023/0295924 A1  Sep. 21, 2023

(30) Foreign Application Priority Data
Dec. 11, 2020 (CN) .......................... 202011463517.6

(51) Int. Cl.
*E04C 2/284* (2006.01)
*B32B 3/04* (2006.01)
(Continued)

(52) U.S. Cl.
CPC ................ *E04C 2/284* (2013.01); *B32B 3/04* (2013.01); *B32B 3/266* (2013.01); *B32B 5/022* (2013.01);
(Continued)

(58) Field of Classification Search
CPC ........... E04C 2/284; B32B 3/04; B32B 3/266; B32B 5/022; B32B 5/262; B32B 7/05;
(Continued)

(56) References Cited

U.S. PATENT DOCUMENTS

| 2007/0004306 A1 | 1/2007 | Leeser et al. |
| 2007/0014979 A1 | 1/2007 | Bullock et al. |

(Continued)

FOREIGN PATENT DOCUMENTS

| CN | 101799099 A | 8/2010 |
| CN | 103434201 A | 12/2013 |

(Continued)

OTHER PUBLICATIONS ip.com translation of CN209454290U (Year: 2023).*
(Continued)

*Primary Examiner* — Michael Zhang
(74) *Attorney, Agent, or Firm* — Seed IP Law Group LLP

(57) ABSTRACT

The disclosure provides a heat insulation composite board and a manufacturing method thereof. The heat insulation composite board includes at least one heat insulation layer, at least one medium layer and at least one outer surface layer, wherein the heat insulation layer and the medium layer are joined into a whole in a physical manner; and the outer surface layer and the medium layer are joined into a whole in a chemical manner. According to the present disclosure, the heat insulation composite board can be produced in a simple physical joint manner and is high in impact resistance, tensile strength and stiffness, and simple in production process, and has low production cost and high production efficiency.

11 Claims, 2 Drawing Sheets

(51) Int. Cl.
  *B32B 3/26*   (2006.01)
  *B32B 5/02*   (2006.01)
  *B32B 5/26*   (2006.01)
  *B32B 7/05*   (2019.01)
  *B32B 7/09*   (2019.01)
  *B32B 7/12*   (2006.01)
(52) U.S. Cl.
  CPC .............. *B32B 5/262* (2021.05); *B32B 7/05* (2019.01); *B32B 7/09* (2019.01); *B32B 7/12* (2013.01); *B32B 2250/20* (2013.01); *B32B 2255/02* (2013.01); *B32B 2255/26* (2013.01); *B32B 2262/0276* (2013.01); *B32B 2262/10* (2013.01); *B32B 2262/101* (2013.01); *B32B 2262/124* (2021.05); *B32B 2307/304* (2013.01); *B32B 2307/3065* (2013.01); *B32B 2307/7376* (2023.05)
(58) Field of Classification Search
  CPC ......... B32B 7/09; B32B 7/12; B32B 2250/20; B32B 2250/02; B32B 2250/26; B32B 2262/0276; B32B 2262/10; B32B 2262/101; B32B 2262/124; B32B 2307/304; B32B 2307/3065; B32B 2307/7376
  See application file for complete search history.

(56) References Cited

U.S. PATENT DOCUMENTS

| | | | | |
|---|---|---|---|---|
| 2014/0147615 A1* | 5/2014 | Fernando | ................ | B32B 5/24 428/688 |
| 2014/0318069 A1* | 10/2014 | Moennig | ............ | E04F 13/0885 52/506.01 |
| 2017/0210093 A1* | 7/2017 | Rikleen | ................ | B32B 27/304 |
| 2020/0047478 A1* | 2/2020 | Hjelmgaard | ............ | B32B 19/04 |
| 2023/0020788 A1* | 1/2023 | Loelsberg | ............... | B32B 5/022 |
| 2023/0413390 A1* | 12/2023 | Lim | ........................ | F16L 59/00 |

FOREIGN PATENT DOCUMENTS

| | | | | |
|---|---|---|---|---|
| CN | 204284800 | U | * | 4/2015 |
| CN | 106567466 | A | | 4/2017 |
| CN | 208418710 | U | | 1/2019 |
| CN | 110016997 | A | | 7/2019 |
| CN | 209454290 | U | * | 10/2019 |
| CN | 210530212 | U | | 5/2020 |
| CN | 211902071 | U | | 11/2020 |
| CN | 214239814 | U | | 9/2021 |
| WO | 2022122046 | A1 | | 6/2022 |

OTHER PUBLICATIONS

Service Thread, PTFE Industrial Sewing Thread Advantages & Disadvantages, Jul. 26, 2016, https://www.servicethread.com/blog/ptfe-sewing-thread-advantages-vs-disadvantages (Year: 2016).*

Ningbo Fidek, What is the difference between fiberglass cloth and non-woven fabric?, Nov. 24, 2018, https://www.fideksealing.com/news/what-is-the-difference-between-fiberglass-cloth-and-non-woven-fabric.html (Year: 2018).*

Victas, Glass Fibre PTFE Coated Sewing Thread, Aug. 23, 2017, https://web.archive.org/web/20170823071405/http://www.vitcas.com/prd/glass-fibre-ptfe-coated (Year: 2017).* ip.com translation of CN-204284800-U (Year: 2024).*

* cited by examiner

HEAT INSULATION COMPOSITE BOARD AND MANUFACTURING METHOD THEREOF

CROSS REFERENCE TO RELATED APPLICATIONS

The present application claims the priority of the Chinese patent application No. 202011463517.6, filed on Dec. 11, 2020, all contents of which are incorporated herein by reference.

BACKGROUND

Technical Field

The present disclosure relates to the technical field of thermal insulation, in particular to a heat insulation composite board and a manufacturing method thereof.

Description of the Related Art

At present, there are various heat insulation boards in the market, wherein traditional heat insulation materials are large in density, poor in heat insulation performance, thick when being laid, large in material loss, high in hygroscopicity, poor in anti-seismic performance and environment-friendly performance and incapable of reaching the energy-saving standard. In addition, some heat insulation materials can cause harm to the human body.

Aerogel is a porous material with a nano-scale aperture, and has extremely low heat conductivity and good heat insulation effect. In the prior art, aerogel or an aerogel product is used as a sandwich structure to produce a heat insulation composite board, so as to improve the impact resistance and the like, and has been widely applied to heat insulation of pipelines, building walls, vehicles and boxes/cabinets.

In the prior art, aerogel or an aerogel product serving as a heat insulation layer in the heat insulation composite board is often bonded with an external panel layer in a chemical mode, however, due to the hydrophobicity of the aerogel, the bonding strength is difficult to guarantee, as a result, the overall tensile strength of the heat insulation composite board is reduced, the stiffness is low, the production process is complex and tedious, and the cost is possibly increased when a special adhesive is selected. In addition, nano aerogel felt itself is a glass fiber base material, has a loose layered structure, and thus is prone to peeling off and falling off after being laid as a heat insulation layer for a wall, thereby causing safety hazard. The above problems greatly limit the application and development of the aerogel-based heat insulation and heat preservation composite board.

BRIEF SUMMARY

In order to solve the problem, the present disclosure aims to provide a heat insulation composite board having strong impact resistance, high tensile strength and high stiffness and a manufacturing method thereof.

The present disclosure provides the summary part of the present disclosure to concisely introduce the concepts which will be described in detail in embodiment part below. The summary part of the present disclosure is not intended to identify key features or necessary features of the technical solution required to be protected, and is also not intended to limit the scope of the technical solution required to be protected.

In order to solve the above technical problems, an embodiment of the present disclosure provides a heat insulation composite board, characterized by including at least one heat insulation layer, at least one medium layer and at least one outer surface layer, wherein
    the heat insulation layer and the medium layer are joined into a whole in a physical manner; and
    the outer surface layer and the medium layer are joined into a whole in a chemical manner.

In order to solve the above technical problem, an embodiment of the present disclosure further provides a heat insulation composite board, including:
    at least one heat insulation layer and at least one outer surface layer, wherein
    the outer surface layer and the heat insulation layer are joined into a whole in a sewing or nailing manner.

In order to solve the technical problem, an embodiment of the present disclosure further provides a manufacturing method of the foregoing heat insulation composite board, which is characterized in that
    at least one surface of the heat insulation layer is sewed or nailed with the medium layer; and
    the medium layer is joined with the outer surface layer in a bonding manner.

In order to solve the technical problem, an embodiment of the present disclosure further provides a manufacturing method of the foregoing heat insulation composite board, which is characterized in that
    the heat insulation layer and the outer surface layer are joined into a whole in a sewing or nailing manner by utilizing through holes and/or thread slots formed in the outer surface layer.

According to the technical solution disclosed by the present disclosure, compared with the prior art, the heat insulation composite board produced in a simple physical joint mode is high in impact resistance, tensile strength and stiffness, and simple in production process, and has low production cost and high production efficiency.

Figure 1:
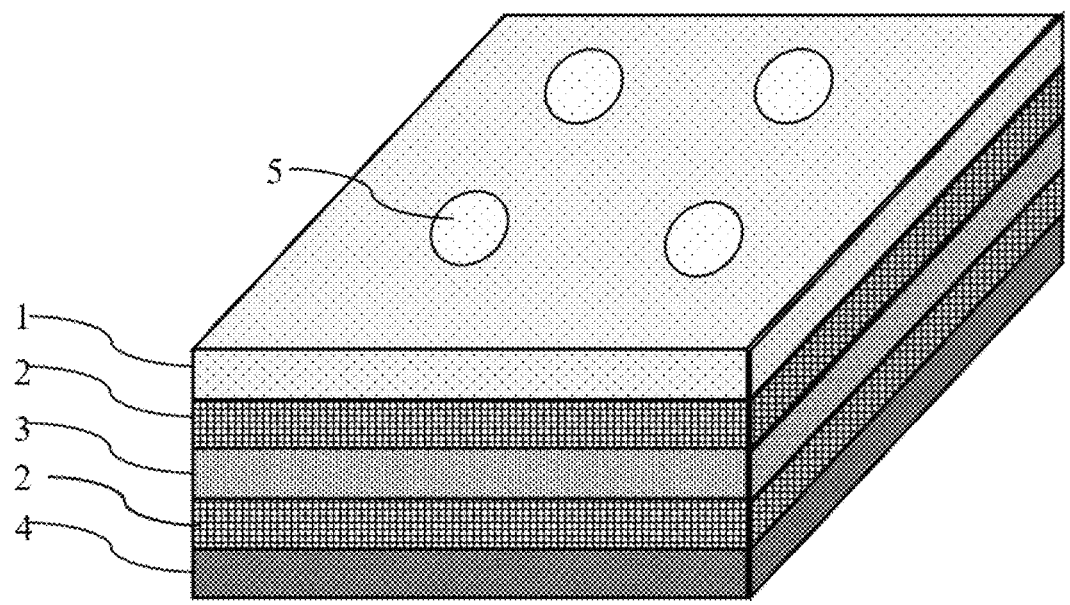
FIG. 1 is a stereogram of an embodiment of a heat insulation composite board disclosed by the present disclosure.

In combination with the accompanying drawings and with reference to the following specific embodiments, the above and other features, advantages and aspects of the embodiments of the present disclosure will become more obvious. Throughout the accompanying drawings, the same or similar reference numerals represent the same or similar elements.

It should be understood that the drawings are schematic, and components and elements are not necessarily drawn in proportion.

DETAILED DESCRIPTION

Unless otherwise defined, all the technical and scientific terms used herein have the same meaning as those generally understood by those skilled in the art to which the present disclosure belongs; the terms used in the description of the present application are only for the purpose of describing specific embodiments, and are not intended to limit the present disclosure; the terms "include" and "have" in the description and claims of the present disclosure and the above drawings and any deformations thereof are intended to cover non-exclusive inclusion. The terms "first," "second," or the like in the description and claims of the present disclosure or the above drawings are used to distinguish different objects, rather than describing a specific order.

"Embodiments" mentioned herein mean that specific features, structures, or characteristics described in conjunction with the embodiments may be included in at least one embodiment of the present disclosure. The phrase at each location in the description does not necessarily refer to the same embodiment, nor is it an independent or alternative embodiment that is mutually exclusive from other embodiments. It should be explicitly and implicitly understood by those skilled in the art that the embodiments described herein may be combined with other embodiments.

In order to enable those skilled in the art to better understand the solution disclosed by the present disclosure, the technical solutions in the embodiments of the present disclosure are clearly and completely described in combination with the accompanying drawings.

Besides, it should be noted that the upper, lower, left and right directions in the drawings are only examples of the specific embodiments, and those skilled in the art can change the directions of part or all of the components shown in the drawings according to actual requirements to apply the components without influencing the implementation of the various components or the whole system. The technical solutions for changing the direction still belong to the scope of protection of the present disclosure.

Heat Insulation Composite Board

A heat insulation composite board according to the present disclosure includes at least one heat insulation layer, at least one medium layer and at least one outer surface layer.

Figure 2:
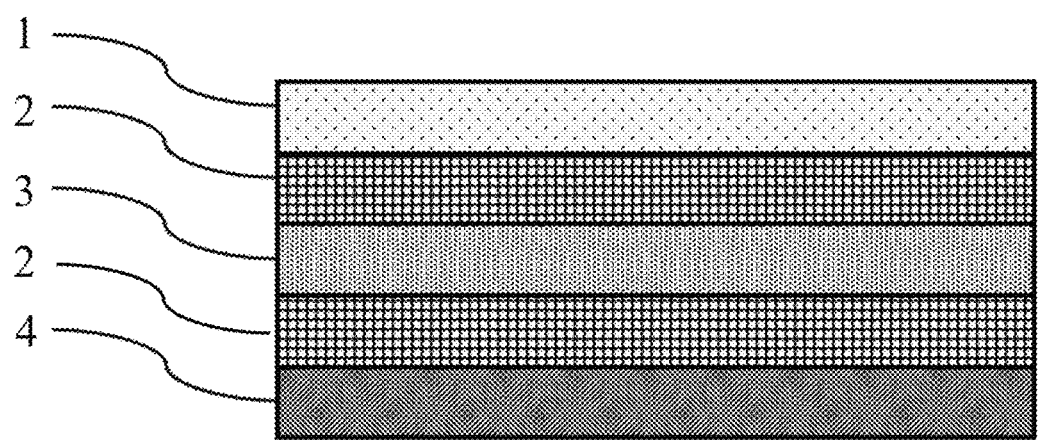
FIG. 2 is a section view of an embodiment of a heat insulation and heat preservation composite board disclosed by the present disclosure.

As shown in FIG. 1 and FIG. 2 which are respectively schematic diagrams of embodiments of a heat insulation composite board disclosed by the present disclosure, FIG. 1 is a stereogram of an embodiment of a heat insulation composite board disclosed by the present disclosure; and FIG. 2 is a section view of an embodiment of a heat insulation composite board disclosed by the present disclosure.

The heat insulation composite board is provided with an inner-side outer surface layer 1, a medium layer 2, a heat insulation layer 3, a medium layer 2, an outer-side outer surface layer 4 and holes 5 from top to bottom. Certainly, the heat insulation composite board can be only provided with the inner-side outer surface layer 1 or the outer-side outer surface layer 4 and can also be only provided with one medium layer 2, the quantity of the layers is not limited, for example, two or more heat insulation layers 3 may be arranged according to the actual conditions. A thickness of each layer of the heat insulation composite board is not limited, for example, the thickness of each layer can be 1 cm, and certainly, the thickness of each layer can also be 2 cm or more, and different thicknesses can be set according to the actual conditions and are not limited. However, in consideration of the use of a heat insulation layer for a wall, it is preferable that there are two layers of aerogel felts being 1 cm thick.

In one or more embodiments, the heat insulation layer 3, for example, includes an aerogel felt and can also include aerogel cloth, aerogel paper, an aerogel plate, a fiber reinforced aerogel felt, other special-shaped aerogel pieces, or other aerogel products, which is not limited.

In one or more embodiments, aerogel may be, for example, any one of silicon dioxide aerogel, carbon aerogel, aluminum oxide aerogel, zirconium oxide aerogel, titanium oxide aerogel, iron oxide aerogel, cobalt oxide aerogel, nickel oxide aerogel, copper oxide aerogel, yttrium oxide aerogel, cerium oxide aerogel, vanadium oxide aerogel, bismuth oxide aerogel, tin oxide aerogel, benzenediol formaldehyde aerogel, or graphene aerogel.

In one or more embodiments, fiber in the fiber reinforced aerogel felt may be any one of glass fiber, carbon fiber, quartz fiber, high silica fiber, aluminum silicate fiber, mullite fiber, silicon carbide fiber, silicon nitride fiber, aluminum oxide fiber, boron nitride fiber, basalt fiber, brucite fiber, attapulgite fiber, boron fiber, carbon nanotubes, aramid fiber, polyimide fiber, or ultra-high molecular weight polyethylene fiber.

In one or more embodiments, the medium layer 2 may include, for example, at least any one of a polyester fiber metal coated fabric, a non-woven fabric, a glass fiber felt, or a glass fiber mesh.

Certainly, the material of the medium layer 2 of the heat insulation composite board may also include but is not limited to hard paper, soft paper, non-woven fabric, offset paper, coated paper, cast coated paper, laser sprayed paper, kraft paper, fluorescent paper, gold-plated paper, aluminum-foil paper, fragile (anti-counterfeiting) paper, silver-plated paper, masking paper, label (Tyvek/nylon) paper, nacreous paper, sandwich coated paper, variable information paper and low-density polyethylene, linear low-density polyethylene, high-density polyethylene, biaxially oriented polypropylene, casting polypropylene, polyphenylene sulfide, polystyrene, polyester, polyamide, polyvinylidene chloride, polycarbonate, polyvinyl alcohol, polylactic acid, aluminum foil, rubber for contact, transparent polyester (PET), semi-transparent polyester (PET), transparent oriented polypropylene (OPP), semi-transparent oriented polypropylene (OPP), light white polyvinyl chloride (PVC), non-light-white polyvinyl chloride (PVC), matt white polyvinyl chloride (PVC), synthetic paper, glazed gold (silver) polyester, matt gold (silver) polyester or the like, which can be easily joined with the outer surface layer in a chemical manner.

In one or more embodiments, the inner-side outer surface layer 1 and/or the outer-side outer surface layer 4 may include, for example, at least any one of a metal plate, a ceramic plate, a slab stone, an adhesive mortar, a cement plate, a calcium silicate plate, a gypsum plate, a sound absorbing material, or a sound attenuation material.

In one or more embodiments, for the inner-side outer surface layer 1 and/or the outer-side outer surface layer 4, for example, one side surface may be a smooth composite core material, and the other side surface is processed by adopting a texturing and wire drawing process, so that the inner-side outer surface layer 1 and/or the outer-side outer surface layer 4 may, by smearing bonding cement or the like, be more easily paved on a wall, for example.

In one or more embodiments, the outer-side outer surface layer (4) is preferably made from materials such as a metal with strong weather resistance and a light calcium silicate board. The outer-side outer surface layer 4 may be, for example, a facing material and is used by adopting a process of dry hanging construction clinging to the wall.

In one or more embodiments, the inner-side outer surface layer 1 is preferably made from a high-strength gypsum plate, a light calcium silicate plate and the like, and is preferably processed by adopting a texturing and wire drawing process, so that the bonding strength and the flatness when the inner-side outer surface layer 1 is paved on, for example, a wall are enhanced.

In one or more embodiments, the inner-side outer surface layer 1 and/or the outer-side outer surface layer 4 may be, for example, provided with holes 5 with a diameter of 2~50 mm according to an interval of 15 mm~70 mm, preferably, holes 5 with a diameter of 5~20 mm according to an interval of 25 mm~60 mm, as shown in FIG. 1, for example, holes with a diameter of 15 mm according to an interval of 5 cm can be formed in transverse and vertical directions, preferably, when the inner-side outer surface layer 1 and/or the outer-side outer surface layer 4 are/is coated with a bonding material and laid on, for example, a wall, a better bonding effect is achieved.

In one or more embodiments, the quantity, size and layout of the holes 5 of the heat insulation composite board are not specially limited, and can be selected according to the required bonding effect. Although the holes 5 shown in FIG. 1 are circular, the shapes of the holes 5 are not limited to this, can also be other shapes, such as a rectangle, a square, a circle, a slit shape, and other polygons.

Furthermore, although FIG. 1 shows that a plurality of holes 5 of the heat insulation composite board are arranged in a matrix pattern at equal intervals, the plurality of holes 5 can also be arranged according to other intervals, layouts and patterns, such as a concentric annular pattern and an irregular distribution pattern, and the plurality of holes 5 are not limited to be arranged at equal intervals.

Furthermore, although FIG. 1 shows that a blind hole is formed by partially removing the material of the inner-side outer surface layer 1 and/or the outer-side outer surface layer 4 in order to form the holes 5, which is not limited, through holes can be formed by completely removing materials of outer surface layers of the holes 5.

In addition, the sizes and layout patterns of the holes 5 can be selected according to the required bonding effect. Specifically, if a better bonding effect is required, the holes can be set to be larger in size and/or set to be greater in quantity; and on the contrary, the holes also can be set to be smaller in size and/or set to be greater in quantity.

In one or more embodiments, the inner-side outer surface layer 1 and/or the outer-side outer surface layer 4 may be, for example, provided with through holes and/or slots, and are joined with other layers into a whole by utilizing the through holes and/or slots in a physical manner, for example, in a sewing or nailing manner. Therefore, the needle and thread movement can be easily controlled during sewing and/or nailing, so that product modes are neat and attractive, threads and/or nails for sewing and/or nailing cannot protrude out of the surface, and the threads and/or nails are protected from being damaged during use.

In one or more embodiments, the row and/or column spacing of the thread slots is, for example, 30 mm~60 mm and the distance of the through holes is, for example, 10 mm~15 mm, preferably the row and/or column spacing of the thread slots is 50 mm and the distance of the through holes is 15 mm.

In one or more embodiments, the heat insulation layer 3 and the medium layer 2 are joined into a whole in a physical manner; and of course, other layers, for example, the heat insulation layer 3 and the inner-side outer surface layer 1 and/or the outer-side outer surface layer 4 may also be joined in a physical manner, which is not limited herein.

In one or more embodiments, the physical manner may include, for example, at least any one of sewing, nailing, riveting, bolted joint, clamping, or micro-hook fitting (e.g., a primary-and-secondary adhesive tape-like manner).

In one or more embodiments, when a physical manner of sewing is adopted, for example, PTFE sewing threads (polytetrafluoroethylene sewing threads) with acid and alkali resistance, corrosion resistance and high temperature resistance are adopted for sewing. When a physical manner of nailing is adopted, for example, rod-shaped buckle type metal aluminum alloy or high-strength carbon steel hardware is adopted for nailing.

The long-term retention rate of the strength of a PTFE sewing thread subjected to acid-alkali treatment is about 80%, and due to the unique molecular structure of PTFE (PTFE molecules are carbon chains surrounded by F atoms, and short C—F bond length has large bond energy), acid and alkali cannot destroy the molecular structure of PTFE. The PTFE sewing thread is extremely high in acid resistance and alkali resistance, so that the PTFE sewing thread can be used under most exhaust gas working conditions.

Under the temperature condition of 230~320° C., due to the disorientation effect on the PTFE sewing thread by high temperature, the strength and breaking elongation of the PTFE sewing thread decrease and increase respectively with the increase of heat treatment temperature; the PTFE sewing thread can be used for a long time in the temperature range of 230° C., which is more suitable for a garbage incinerator and dust removal for exhaust gas of a coal-fired boiler.

Certainly, when the physical manner of sewing or nailing is adopted, acid-resistant and alkali-resistant, corrosion-resistant, and high-temperature-resistant polymer nylon threads or other material threads, for example, also can be used as sewing threads or nailing threads for sewing or nailing, which is not limited.

In one or more embodiments, the row spacing and/or column spacing of the sewing or nailing thread is, for example, 30 mm~60 mm, a stitch distance is, for example, 10 mm~15 mm, preferably, the row spacing and/or column spacing is 50 mm, and the stitch distance is 15 mm.

In one or more embodiments, the medium layer 2 can, for example, cover or completely wrap the heat insulation layer 3, so that when the material of the heat insulation layer 3 enters production equipment, for example, quilting thread sewing equipment for sewing, workshop environment pollution and harm to the human lung caused by powder falling and glass fiber dust flying due to vibration of the equipment are prevented.

In one or more embodiments, the inner-side outer surface layer 1 and/or the outer-side outer surface layer 4 is joined with the medium layer 2 into a whole in a chemical manner. The chemical manner may, for example, include bonding manners using at least any one of an adhesive, a double-sided tape, a plant adhesive, a polyurethane composite adhesive, an epoxy resin, a curing agent, an accelerant, a water-based elastic coating, a water-based resin, a water-based environment-friendly composite adhesive, a flame retardant or a dispersing agent.

In one or more embodiments, the layers of the heat insulation composite board can be bonded through an adhesive, the material of the adhesive can include but is not limited to a universal super-sticky type material, a universal strong-sticky type material, a refrigerated food strong-sticky type material, a universal re-uncovering type material, a fiber re-uncovering type material or the like, and preferably a material with a low heat conductivity coefficient.

The heat insulation composite board of the present disclosure preferably has a total thickness of 25~80 mm, in consideration of the use when the heat insulation composite board is used as a heat insulation layer for a wall, it is more preferable that two layers of aerogel felts are 10 mm thick, and the overall thickness is about 30 mm, thereby not only ensuring the effect of heat insulation, and also enabling not too much space occupation, and achieving better stiffness and tensile property through the physical combination. The heat insulation composite board is preferably made from a material with a high fireproof grade, an overall fireproof grade is A1 grade, a heat conductivity coefficient is 0.01~0.05, and preferably, the overall heat conductivity coefficient is about 0.020. The overall heat insulation composite plate can, for example, be in various shapes such as a rectangular plate shape, a square plate shape, a circular plate shape and a hexagonal plate shape.

In addition, although the sandwich structure formed by the inner-side outer surface layer 1, the medium layer 2, the heat insulation layer 3, the medium layer 2 and the outer-side outer surface layer 4 is shown in the FIG. 1 and FIG. 2, which is not limited, and the heat insulation composite board can also be of a multi-layer sandwich structure, for example, the quantity of each layer is two or more.

The respective layers can be joined by adopting a physical manner which may, for example, include at least any one of sewing, nailing, riveting, bolted joint, clamping or micro-hook fitting, and also by adopting a chemical manner which may, for example, include bonding manners using at least any one of an adhesive, a double-sided tape, a plant adhesive, a polyurethane composite adhesive, an epoxy resin, a curing agent, an accelerant, a water-based elastic coating, a water-based resin, a water-based environment-friendly composite adhesive, a flame retardant or a dispersing agent.

Manufacturing Method

Embodiment 1

According to one or more embodiments of the present disclosure, a manufacturing method of a heat insulation composite board is provided, and the heat insulation composite board, for example as shown in FIG. 1, is provided with an inner-side outer surface layer 1, a medium layer 2, a heat insulation layer 3, a medium layer 2, an outer-side outer surface layer 4 and holes 5 from top to bottom.

Figure 3:
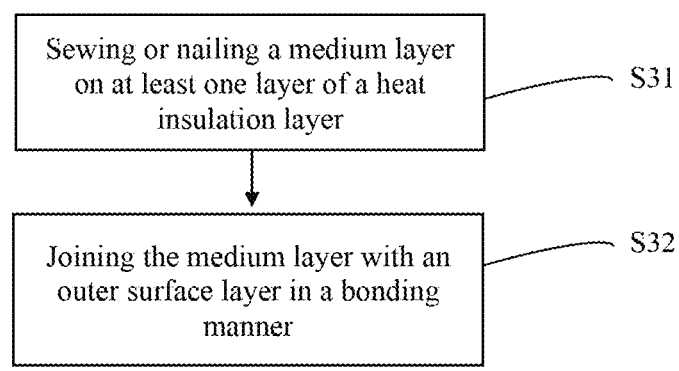
FIG. 3 is a flow chart of an embodiment of a manufacturing method disclosed by the present disclosure; and
    wherein 1 represents an inner-side outer surface layer of a heat insulation composite board, 2 represents a medium layer of the heat insulation composite board, 3 represents a heat insulation layer of the heat insulation composite board, and 4 represents an outer-side outer surface layer of the heat insulation composite board.

As shown in FIG. 3, the manufacturing method in the embodiment includes the following steps.

S31, the medium layer 2, for example, a glass fiber felt, is sewed or nailed on at least one surface, for example, an aerogel felt, of the heat insulation layer 3.

In one or more embodiments, the manufacturing method in the embodiment can further include the following steps:
flatly laying an aerogel felt of the heat insulation layer 3;
paving the glass fiber felt of the medium layer 2 to form a bag-shaped aerogel felt completely wrapping the heat insulation layer 3; and
(3) putting the aerogel felt of the heat insulation layer 3 wrapped by the glass fiber felt of the medium layer 2 into quilting thread sewing equipment for sewing by using, for example, acid-resistant and alkali-resistant, corrosion-resistant, and high-temperature-resistant PTFE (polytetrafluoroethylene) sewing threads.

S32, the medium layer 2 is joined with an outer surface layer in a bonding manner, for example, the inner-side outer surface layer 1 and/or the outer-side outer surface layer 4.

In one or more embodiments, the manufacturing method in the embodiment can further include the following steps:
brushing, for example an adhesive, on an upper surface and a lower surface of the sewed medium layer 2; and
respectively bonding smooth composite core material sides of the inner-side outer surface layer 1 and the outer-side outer surface layer 4 to the upper surface and the lower surface of the medium layer 2.

In one or more embodiments, a hot press molding process may also be performed at, for example, 100° C. and a pressure of 5 Mpa.

Embodiment 2

According to one or more embodiments of the present disclosure, a manufacturing method of a heat insulation composite board is provided, wherein the heat insulation composite board, for example, only includes a heat insulation layer 3 and an outer surface layer, for example, an inner-side outer surface layer 1 and/or an outer-side outer surface layer 4, the inner-side outer surface layer 1 and/or the outer-side outer surface layer 4 are/is provided with through holes and/or thread slots for joining, for example, acid-resistant, alkali-resistant, corrosion-resistant, high-temperature-resistant PTFE sewing threads.

The Manufacturing Method in the Embodiment Includes:
joining the heat insulation layer 3 and the outer surface layer, for example, the inner-side outer surface layer 1 and/or the outer-side outer surface layer 4 into a whole in a sewing or nailing manner by utilizing through hoes and/or thread slots in the outer surface layer, for example, the inner-side outer surface 1 and the outer-side outer surface layer 4.

In one or more embodiments, the manufacturing method in the embodiment can further include the following steps:
flatly laying an aerogel felt of the heat insulation layer 3;
respectively paving the inner-side outer surface layer 1 and the outer-side outer surface layer 4 on the upper surface and the lower surface of the aerogel felt of the heat insulation layer 3; and
putting the well put aerogel felt of the heat insulation layer 3, the inner-side outer surface layer 1 and the outer-side outer surface layer 4 into the quilting thread sewing equipment for example, and sewing by using, for example, PTFE sewing threads with acid and alkali resistance, corrosion resistance and high temperature resistance.

It should be understood that although all the steps in the flow chart of the drawing are displayed in sequence according to the indication of an arrow, the steps are not necessarily performed in sequence according to the indication of the arrow. Unless expressly stated herein, these steps are executed in manner free from strict sequence limitation, and may be performed in other sequences. Moreover, at least a part of steps in the flow chart of the drawing may include a plurality of sub-steps or a plurality of stages, these sub-steps or stages are not necessarily executed to be completed at the same moment, but can be executed at different moments, and the execution sequence is not necessarily performed in sequence, but the sub-steps or stages can be performed in turn or alternately with other steps or at least a part of sub-steps or stages of other steps.

According to one or more embodiments of the present disclosure, a heat insulation and heat preservation composite board is provided and is characterized by including at least one heat insulation layer, at least one medium layer and at least one outer surface layer;
the heat insulation layer and the medium layer are joined into a whole in a physical manner; and
the outer surface layer and the medium layer are joined into a whole in a chemical manner.

According to one or more embodiments of the present disclosure, a heat insulation composite board is provided, and is characterized in that
the heat insulation layer includes an aerogel felt;
the medium layer includes at least any one of a polyester fiber metal coated fabric, a non-woven fabric, a glass fiber felt or a glass fiber mesh; and
The outer surface layer includes at least any one of a metal plate, a ceramic plate, a slab stone, an adhesive mortar, a cement plate, a calcium silicate plate, a gypsum plate, a sound absorbing material or a sound attenuation material.

According to one or more embodiments of the present disclosure, a heat insulation composite board is provided, and is characterized in that
the heat insulation layer includes one layer or two layers of aerogel felts, and the medium layer covers or wraps the aerogel felts.

According to one or more embodiments of the present disclosure, a heat insulation composite board is provided, and is characterized in that
The physical manner includes at least any one of sewing, nailing, riveting, bolted joint, clamping or micro-hook fitting;
The chemical manner includes bonding manners by using at least any one of an adhesive, a double-sided tape, a plant adhesive, a polyurethane composite adhesive, epoxy resin, a curing agent, an accelerant, a water-based elastic coating, a water-based resin, a water-based environment-friendly composite adhesive, a flame retardant or a dispersing agent.

According to one or more embodiments of the present disclosure, a heat insulation composite board is provided, and is characterized in that
when the physical manner of sewing is adopted, acid-resistant and alkali-resistant, corrosion-resistant, and high-temperature-resistant PTFE sewing threads (polytetrafluoroethylene sewing threads) are adopted for sewing; and
when a physical manner of nailing is adopted, rod-shaped buckle type metal aluminum alloy or high-strength carbon steel hardware is adopted for nailing.

According to one or more embodiments of the present disclosure, a heat insulation composite board is provided, and is characterized in that
the heat insulation composite board has a total thickness of 30~80 mm, a fireproof grade being A1 grade, and a heat conductivity coefficient being 0.01~0.05;
the row spacing and/or column spacing of the sewing or nailing thread is 30 mm~60 mm, and the stitch distance is 10 mm~15 mm; and
the outer surface layer includes a first outer surface layer and a second outer surface layer, and the outer surface of the first outer surface layer and/or the second outer surface layer is processed by adopting a texturing and wire drawing process, or holes with a diameter of 5~20 mm are formed at an interval of 25 mm~60 mm.

According to one or more embodiments of the present disclosure, a heat insulation composite board is provided, and is characterized by comprising
at least one heat insulation layer and at least one outer surface layer, wherein
the outer surface layer and the heat insulation layer are joined into a whole in a sewing or nailing manner.

According to one or more embodiments of the present disclosure, a heat insulation composite board is provided, and is characterized in that
the heat insulation layer includes an aerogel felt;
the outer surface layer includes at least any one of a metal plate, a ceramic plate, a slab stone, an adhesive mortar, a cement plate, a calcium silicate plate, a gypsum plate, a sound absorbing material or a sound attenuation material; and
the outer surface layer is provided with through holes and/or thread slots, and the outer surface layer and the heat insulation layer are joined into a whole in a sewing or nailing manner by utilizing the through holes and/or the thread slots.

According to one or more embodiments of the present disclosure, a manufacturing method of a heat insulation composite board is provided, and is characterized in that
at least one surface of the heat insulation layer is sewed or nailed with the medium layer; and
the medium layer is joined with the outer surface layer in a bonding manner.

According to one or more embodiments of the present disclosure, a manufacturing method of a heat insulation composite board is provided, and is characterized in that
the heat insulation layer and the outer surface layer are joined into a whole in a sewing or nailing manner by utilizing through holes and/or thread slots formed in the outer surface layer.

The above description is only a preferred embodiment of the present disclosure and an illustration of the applied technical principle. Those skilled in the art should understand that the scope involved in the present disclosure is not limited to the technical solutions formed by specific combination of the technical features, and also should cover other technical solutions formed by arbitrary combination of the technical features or equivalent features thereof without departing from the concept of the present disclosure, for example, the technical solution formed by replacing the above features with (but not limited to) technical features with similar functions disclosed in the present disclosure.

Further, although various operations are described in a specific sequence, it should not be understood as that these operations are required to be performed in the specific sequence order shown or in a sequential order. Likewise, although several specific implementation details are included in the above description, these should not be interpreted as limitations on the scope of the present disclosure. Certain features described in the context of the independent embodiments may also be implemented in combination in a single embodiment. On the contrary, various features described in the context of the single embodiment may also be implemented in multiple embodiments either alone or in any suitable sub-combination.

Although the subject matter has been described in a language specific to structural features and/or method actions, it should be understood that the subject matter defined in appended claims is not necessarily limited to the specific features or actions described above. On the contrary, the specific features and actions described above are only example forms of implementing the claims.

The invention claimed is:

1. A heat insulation composite board, comprising at least one heat insulation layer, at least one medium layer and at least one outer surface layer; wherein
  a heat insulation layer of the at least one heat insulation layer and a medium layer of the at least one medium layer are joined into a whole in a physical manner that includes sewing having a sewing thread; and
  an outer layer of the at least one outer surface layer and the medium layer are joined into a whole in a chemical manner,
  wherein the outer surface layer comprises at least any one of a metal plate, a ceramic plate, a slab stone, an adhesive mortar, a cement plate, a calcium silicate plate, a gypsum plate, a sound absorbing material or a sound attenuation material;
  wherein the outer surface layer comprises a first outer surface layer and a second outer surface layer, and one or more of an outer surface of the first outer surface layer or an outer surface of the second outer surface layer includes one or more of textures, thread slots, or holes with a diameter of 5~20 mm and arranged at an interval of 25 mm~60 mm among one another;
  wherein the first outer surface layer is a facing material, one side surface of the first outer surface layer or the second outer surface layer is a smooth composite core material, and the other side surface of the first outer surface layer or the second outer surface layer includes texturing, so that the first outer surface layer or the second outer surface layer is, by smearing bonding cement, more easily paved on a wall,
  wherein the heat insulation composite board has a total thickness of 30~80 mm, a fireproof grade being A1, and a heat conductivity coefficient being 0.01~0.05 W/(m·K), and
  wherein one or more of a row spacing or a column spacing of the sewing thread is 30 mm~60 mm, and a stitch distance is 10 mm~15 mm.

2. The heat insulation composite board according to claim 1, wherein
  the heat insulation layer comprises an aerogel felt;
  the medium layer comprises at least any one of a polyester fiber metal coated fabric, a non-woven fabric, a glass fiber felt or a glass fiber mesh.

3. The heat insulation composite board according to claim 1, wherein the heat insulation layer comprises one layer or two layers of aerogel felts, and the medium layer covers or wraps the aerogel felts.

4. The heat insulation composite board according to claim 1, wherein
  the physical manner includes sewing and at least one of nailing, riveting, bolted joint, clamping or micro-hook fitting; and
  the chemical manner comprises bonding manners by using at least any one of an adhesive, a double-sided tape, a plant adhesive, a polyurethane composite adhesive, epoxy resin, a curing agent, an accelerant, a water-based elastic coating, a water-based resin, a water-based environment-friendly composite adhesive, a flame retardant or a dispersing agent.

5. The heat insulation composite board according to claim 4, wherein
  when the physical manner of nailing is adopted, rod-shaped buckle type metal aluminum alloy or high-strength carbon steel hardware is adopted for nailing.

6. The heat insulation composite board according to claim 1, wherein
  acid-resistant and alkali-resistant, corrosion-resistant PTFE sewing threads (polytetrafluoroethylene sewing threads) are adopted for the sewing.

7. A manufacturing method of the heat insulation composite board according to claim 1, comprising:
  sewing or nailing a medium layer on at least one surface of a heat insulation layer; and
  joining the medium layer with an outer surface layer in a bonding manner.

8. A heat insulation composite board, comprising:
  at least one heat insulation layer, at least one medium layer, and at least one outer surface layer, wherein
  an outer surface layer of the at least one outer surface layer and a medium layer of the at least one medium layer are joined into a whole, and a heat insulation layer of the at least one heat insulation layer and a medium layer of the at least one medium layer are joined into a whole in a physical joining manner that includes sewing having a sewing thread;
  the outer surface layer comprises at least any one of a metal plate, a ceramic plate, a stone slab, an adhesive mortar, a cement plate, a calcium silicate plate, a gypsum plate, a sound absorbing material or a sound attenuation material; and
  the outer surface layer is provided with through one or more of holes or thread slots, and the outer surface layer and the heat insulation layer are joined into a whole in a sewing or nailing manner by utilizing the one or more of the through holes or the thread slots;
  the first outer surface layer is a facing material, one side surface of the first outer surface layer or the second outer surface layer is a smooth composite core material, and the other side surface of the first outer surface layer or the second outer surface layer includes texturing, so that the first outer surface layer or the second outer surface layer is, by smearing bonding cement, more easily paved on a wall,
  wherein the heat insulation composite board has a total thickness of 30~80 mm, a fireproof grade being A1, and a heat conductivity coefficient being 0.01~0.05 W/(m·K), and
  wherein one or more of a row spacing or a column spacing of the sewing thread of the sewing is 30 mm~60 mm, and a stitch distance of the sewing is 10 mm~15 mm.

9. The heat insulation composite board according to claim 8, wherein
  the heat insulation layer comprises an aerogel felt.

10. The heat insulation composite board according to claim 8, wherein the physical joining manner includes nailing.

11. A manufacturing method of the heat insulation composite board according to claim 8, comprising:
  joining a heat insulation layer and an outer surface layer into a whole in the sewing or nailing manner by utilizing through holes and/or thread slots formed in the outer surface layer.

* * * * *